Patented Feb. 5, 1929.

1,701,110

UNITED STATES PATENT OFFICE.

HUGO HOFMANN, OF BARMEN, GERMANY, ASSIGNOR, BY MESNE ASSIGNMENTS, TO AMERICAN BEMBERG CORPORATION, A CORPORATION OF DELAWARE.

PROCESS FOR THE RECOVERY OF AMMONIA FROM THE WASTE WATERS IN THE MANUFACTURE OF ARTIFICIAL FILAMENTS BY THE CUPRAMMONIA PROCESS.

No Drawing. Application filed April 21, 1925, Serial No. 24,881, and in Germany May 6, 1924. Renewed June 13, 1928.

In the manufacture of artificial filaments by the cuprammonia process the ammonia, as is known, is withdrawn from the filaments passing out of the spinning apparatus by a slowly operating precipitant, for example, warm water, by which the coagulation of the filaments is effected. The ammonia remains dissolved in the precipitant, which latter must be renewed so quickly that the ammonia concentration does not exceed a definite very low value, as otherwise certain undesired solvent action of the precipitant upon the filaments to be produced would be effected. The maximum concentration of ammonia to be adopted in practice is about 0.05 per cent.

There is accordingly in the spinning process a very large amount of very dilute aqueous ammonia solution, the low concentration of which makes it impossible to recover the ammonia economically in a simple manner, as by distillation.

Now the invention has for its object, first to bring the exceedingly dilute ammonia dissolved in the precipitant into a more highly concentrated form, and thus to enable it to be economically recovered.

The method of quantitatively determining magnesium and phosphoric acid by precipitating as magnesium ammonium phosphate is known, wherein an excess of ammonia, always has to be used. This reaction also can be made to proceed in a different sense, that is, in the sense of a practically complete precipitation of the ammonia, and can do so in a particularly quick and favourable manner in solutions in which the concentration of ammonia is very low.

The magnesium ammonium phosphate produced is in the form of a heavy crystalline precipitate which settles down so quickly that the precipitation can be carried out in flowing water with the interposition of a settling tower, practically without loss of magnesium ammonium phosphate.

The precipitate is of such a physical condition as to admit of being easily pressed. The pressed material contains up to 5 per cent of $NH_3$. In this manner accordingly the concentration of ammonia has been increased a hundred fold.

Example 1.

100 cubic meters of precipitant contain 50 kilograms of ammonia in solution. In order to precipitate this ammonia there is added thereto 598 kilograms of a solution of $MgCl_2.6aq.$ and a solution of 10.54 kilograms of $Na_2HPO_4.12aq.$ The magnesium ammonium phosphate thereupon separates out as a crystalline precipitate.

The essence of the invention furthermore consists in the fact that it is possible to quantitatively precipitate the ammonia contained in the waste waters directly by means of magnesium phosphate (or materials capable of forming this), and especially suitable for the process are suitable hydrated forms of secondary magnesium phosphates.

I have discovered that the magnesium phosphates can not all be equally well used to precipitate ammonia quantitatively, thus anhydrous magnesium phosphate does not precipitate ammonia readily, and the one containing $3H_2O$ does not completely remove the ammonia from the solution at room temperature, while the hydrates containing 6 or 7 and $14H_2O$ precipitate the ammonia quantitatively and at ordinary room temperature. Of the latter, the hydrate with $7H_2O$ is most suitable, because it can be cheaply produced easily and with certainty.

The magnesium phosphates to act as precipitant for the ammonia can be added as such to the water containing the ammonia to be recovered, or can be suitably prepared as a transitory product, in the said liquor itself, by adding suitable magnesium compounds and compounds containing the phosphoric acid radical, to the said water, (the latter being more fully explained in the first example given below). Acid magnesium phosphates (e. g. $MgHPO_4$) are very suitable for use in the process.

This invention is particularly important, as was observed above, owing to the fact that these hydrated forms suitable for the precipitation of ammonia can in the first place be produced in a simple manner from any one of the forms of magnesium phosphates that do not precipitate ammonia as well as the heptahydrate, and can then also be directly obtained from magnesium ammonium phosphate similarly or in an even simpler manner. Thus when the precipitation of the ammonia is once initiated the reaction product $Mg(NH_4)PO_4$ admits of being reconverted into hydrated magnesium phosphate, in such a way that the precipitation can always be carried out again with the regenerated magnesium phosphate or its suitably hydrated forms, particularly

*Example 2.*

100 cubic meters of precipitating water containing 50 kilograms of ammonia are mixed with 730 kilograms of $MgHPO_4.7H_2O$. As a crystalline precipitate, 720 kilograms of $MgNH_4PO_4.6aq.$ (dry) is obtained. The reaction may be expressed as follows:—

$MgCl_2+Na_2HPO_4+NH_3+6H_2O=$
$MgNH_4PO_4.6H_2O+2NaCl$

The process, in the case of magnesium phosphates which are not best adapted (or are only adapted in a slight degree) to take up ammonia, such as may be obtained for example when the decomposition of the magnesium ammonium phosphate is effected hot, is that the magnesium phosphate in question is first converted, by dissolving it in sulphuric acid, into $MgSO_4.Mg(H_2PO_4)_2$, and by means of soda a precipitation of $MgHPO_4.7H_2O$ is brought about:—

The $MgSO_4.Mg(H_2PO_4)_2$ solution is also adapted, it is true, for precipitating ammonia but always only in part, as half of the ammonia is converted into ammonium sulphate and remains dissolved.

This process renders it possible to convert all the magnesium phosphates into magnesium phosphates which are capable of precipitating ammonia quantitatively.

*Example 3.*

Assuming that there are 100 kilograms of $MgHPO_4.3H_2O$ to be converted into the hydrated form with $7H_2O$, we add for this purpose 28.6 kilograms of $H_2SO_4$ and precipitate the magnesium sulphate and phosphate obtained with 30.4 kilograms of soda (calcined).

The solution of $MgSO_4.Mg(H_2PO_4)_2$ also admits of course of being united directly with ammonia and soda, the magnesium ammonium phosphate being obtained with formation of magnesium phosphate as an intermediate product.

The preparation of the secondary magnesium phosphate directly from the pressed magnesium ammonium phosphate is also possible according to the invention by decomposing the latter with acid. The precipitated salt, pressed to contain about 50% of water, is treated with a corresponding quantity of acid, for example, sulphuric acid (45 to 60° Bé.) or hydrochloric acid, equivalent to the ammonia, and dissolved ammonium salt and secondary magnesium phosphate with seven molecules of water of crystallization are obtained. While in general ammonium sulphate, particularly in the proportion thus obtained, brings about a dissolving of magnesium phosphate or prevents precipitation thereof, it happens that when certain concentrations as exemplified above, are maintained, all the magnesium phosphate separates out as an insoluble sediment, so that only ammonium salt is to be found in solution. In this case it was discovered that the conditions as to time of reaction, temperature and concentration can be so selected that the magnesium phosphate separating out as an insoluble sediment occurs in the form of such a hydrate that it is directly capable of quantitatively precipitating the ammonia.

If the decomposition of the magnesium ammonium phosphate is carried out with too low a concentration of acid (i. e. much below 45° Bé.) a separation of the double phosphate does not occur at the low heat of reaction. If however greater heat is applied, ammonium sulphate and magnesium phosphate do indeed form, but the latter is precipitated with three molecules of water of crystallization, which form does not take up the ammonia from dilute solutions as readily as does the heptahydrate.

If however, an attempt is made to effect the decomposition of magnesium ammonium phosphate in too high a concentration of acid, (i. e. by adding acid of much over 60° Bé.) this again does not take place. Only after rather prolonged heating does ammonium sulphate form, and precipitates the magnesium phosphate in the less desirable form with three molecules of water of crystallization.

In my copending application, Serial 164,656 filed January 29, 1927 I have made broad claims relating to the subject matter described in Example 1 of this specification and such claims are not, for that reason, made in this case.

What I claim is:—

1. A process for the recovery of ammonia from the precipitant in the manufacture of artificial filaments by the cuprammonia process, consisting in adding thereto a magnesium salt and sodium phosphate, pressing the precipitate to enrich its ammonia content, and separating the ammonia from the magnesium phosphate.

2. A process for the recovery of ammonia from the precipitant in the manufacture of artificial filaments by the cuprammonia process, consisting in precipitating the dilute ammonia by means of a magnesium phosphate capable of quantitative removal of ammonia.

3. A process for the recovery of ammonia from the precipitant in the manufacture of artificial filaments by the cuprammonia process, consisting in precipitating the dilute ammonia by means of a hydrated form of magnesium phosphate capable of quantitative removal of the ammonia from the solution.

4. A process for the recovery of ammonia from the precipitant in the manufacture of artificial filaments by the cuprammonia process, consisting in precipitating the ammonia in the dilute ammonia solution by means of $MgHPO_4.7H_2O$.

5. A process for the recovery of ammonia from the precipitant in the manufacture of artificial filaments by the cuprammonia process, consisting in precipitating the dilute ammonia by means of a magnesium phosphate capable of quantitative precipitation of ammonia and continuously regenerating the magnesium phosphate from the magnesium ammonium phosphate produced.

6. A process for the recovery of ammonia from the precipitant in the manufacture of artificial filaments by the cuprammonia process, consisting in dissolving magnesium phosphates that are incapable of quantitatively precipitating ammonia in acid and reprecipitating them with soda to convert them into magnesium phosphates that are capable of quantitatively precipitating ammonia, and precipitating the dilute ammonia in said precipitant by means of said reprecipitated magnesium phosphates.

7. A process for the recovery of ammonia from the precipitant in the manufacture of artificial filaments by the cuprammonia process, consisting in dissolving magnesium phosphates that are incapable of quantitatively precipitating ammonia in $H_2SO_4$ and reprecipitating them with soda to convert them into magnesium phosphates that are capable of quantitatively precipitating ammonia, and precipitating the dilute ammonia in said precipitant by means of said reprecipitated magnesium phosphates.

8. A process for the recovery of ammonia from the precipitant in the manufacture of artificial filaments by the cuprammonia process consisting in dissolving ammonia out of magnesium ammonium phosphate by sulphuric acid treating the product thereby obtained with sulphuric acid and soda, and precipitating the dilute ammonia in the precipitant by means of the magnesium phosphate thus obtained.

9. A process for the recovery of ammonia from the precipitant in the manufacture of artificial filaments by the cuprammonia process which comprises reacting on the ammonia therein, with the reaction product of magnesium sulphate and magnesium phosphate with soda, to form a precipitate of magnesium ammonium phosphate.

10. A process for the recovery of ammonia from the precipitant in the manufacture of artificial filaments by the cuprammonia process consisting in precipitating the dilute ammonia by means of a magnesium phosphate capable of quantitative removal of the ammonia, decomposing the magnesium ammonium phosphate so obtained with acid in such a manner that magnesium phosphate is quantitatively obtained as an undissolved sediment and the ammonia remains in solution bound to the acid.

11. A process for the recovery of ammonia from the precipitant in the manufacture of artificial filaments by the cuprammonia process, consisting in precipitating the dilute ammonia by means of a magnesium phosphate capable of quantitative precipitation, pressing the resulting magnesium ammonium phosphate until its water content amounts to about 50 per cent., pouring over it as much sulphuric acid of between 45 and 60° Beaumé as corresponds to the ammonia contained in the salt, and using the magnesium phosphate with seven molecules of water of crystallization which separates out quantitatively, for the precipitation of ammonia from a further quantity of the dilute solution.

12. In the recovery of ammonia from used precipitating baths of the cuprammonia cellulose process, the step of reacting upon the ammonia therein with a readily reactive reagent containing the phosphoric acid radical and magnesium, and thereby forming a readily separable precipitate of magnesium ammonium phosphate.

13. A process for the recovery of ammonia from the precipitant in the manufacture of artificial filaments by the cuprammonia process, consisting in precipitating the dilute ammonia by means of a magnesium phosphate.

14. A process for the recovery of ammonia from the precipitant in the manufacture of artificial filaments by the cuprammonia process, consisting in precipitating the dilute ammonia by means of a magnesium phosphate and regenerating the ammonia therefrom.

15. A process for the recovery of ammonia from the precipitant in the manufacture of artificial filaments by the cuprammonia process, consisting in adding thereto soluble phosphates and such compounds reacting with them and producing transitorily magnesium phosphate which reacts immediately with the ammonia to magnesium ammonium phosphate.

16. A process for the recovery of ammonia from the precipitant in the manufacture of artificial filaments by the cuprammonia process, consisting in adding thereto soluble phosphates and such compounds reacting with them and producing transitorily magnesium phosphate which reacts immediately with the ammonia to form magnesium ammonium phosphate, and regenerating the ammonia therefrom.

In testimony whereof I have signed my name to this specification.

HUGO HOFMANN.